US011938719B2

(12) United States Patent
Zaborowski et al.

(10) Patent No.: US 11,938,719 B2
(45) Date of Patent: Mar. 26, 2024

(54) DROP-ON-DEMAND CARD PRINTER WITH INK TRAY

(71) Applicant: Entrust Corporation, Shakopee, MN (US)

(72) Inventors: Alex Zaborowski, Shakopee, MN (US); Randy Jordan, Shakopee, MN (US); Jon Wawra, Shakopee, MN (US); Tim Flitsch, Shakopee, MN (US); Cory Wooldridge, Shakopee, MN (US); Daniel Sarkinen, Shakopee, MN (US)

(73) Assignee: Entrust Corporation, Shakopee, MN (US)

( * ) Notice: Subject to any disclaimer, the term of this patent is extended or adjusted under 35 U.S.C. 154(b) by 0 days.

(21) Appl. No.: 18/053,877

(22) Filed: Nov. 9, 2022

(65) Prior Publication Data

US 2023/0088510 A1 Mar. 23, 2023

Related U.S. Application Data

(63) Continuation of application No. 16/832,415, filed on Mar. 27, 2020, now Pat. No. 11,541,675.
(Continued)

(51) Int. Cl.
*B41J 11/58* (2006.01)
*B41J 11/00* (2006.01)
*B41J 13/12* (2006.01)

(52) U.S. Cl.
CPC ............ *B41J 11/58* (2013.01); *B41J 11/0085* (2013.01); *B41J 13/12* (2013.01)

(58) Field of Classification Search
CPC . B41J 13/12; B41J 13/14; B41J 3/4071; B41J 3/387; B41J 11/0085; B41J 11/0065; G06K 13/07; B65H 2701/1914; B42D 25/00; C09D 11/50; C09D 11/328; C09D 11/102
See application file for complete search history.

(56) References Cited

U.S. PATENT DOCUMENTS 4,825,054 A 4/1989 Rust et al.
4,995,501 A 2/1991 Lundstrom et al.
(Continued)

FOREIGN PATENT DOCUMENTS

CN 101376299 A 3/2009
CN 101466548 A 6/2009
(Continued)

OTHER PUBLICATIONS

Machine Translation of JP-H11254657-A; Produced by Clarivate Analytics Mar. 20, 2023. (Year: 2023).*
(Continued)

*Primary Examiner* — John Zimmermann
(74) *Attorney, Agent, or Firm* — Merchant & Gould P.C.

(57) ABSTRACT

A drop-on-demand plastic card printer includes a tray disposed underneath the plastic card during drop-on-demand printing to catch any overspray that may occur during printing on the plastic card. The tray may be disposable so that the tray is intended to be removed and disposed of. An ink absorbent pad can be disposed in the tray to absorb the oversprayed ink. The ink absorbent pad can be disposed of along with the tray or disposed of separately from the tray.

22 Claims, 8 Drawing Sheets

Related U.S. Application Data (60) Provisional application No. 62/825,957, filed on Mar. 29, 2019.

(56) References Cited

U.S. PATENT DOCUMENTS

| | | | |
|---|---|---|---|
| 5,266,781 A | 11/1993 | Warwick et al. | |
| 5,609,102 A | 3/1997 | Rapp | |
| 5,837,991 A | 11/1998 | LaManna et al. | |
| 6,131,817 A | 10/2000 | Miller | |
| 6,231,646 B1 | 5/2001 | Schweizer et al. | |
| 6,612,762 B1 | 9/2003 | Sakurai | |
| 6,685,312 B2 | 2/2004 | Klinefelter et al. | |
| 6,695,205 B1 | 2/2004 | Lundstrom et al. | |
| 6,783,067 B2 | 8/2004 | Kreuter et al. | |
| 6,902,107 B2 | 6/2005 | Shay et al. | |
| 7,101,096 B2 | 9/2006 | Sasai | |
| 7,398,972 B2 | 7/2008 | Schuller et al. | |
| 7,434,728 B2 | 10/2008 | Paulson et al. | |
| 11,642,880 B2 | 5/2023 | Skoglund et al. | |
| 2001/0028380 A1* | 10/2001 | Wotton | B41J 11/0085 400/656 |
| 2001/0042400 A1 | 11/2001 | Boyle et al. | |
| 2001/0055054 A1 | 12/2001 | Kosaka et al. | |
| 2002/0112637 A1 | 8/2002 | Kosaka et al. | |
| 2004/0066441 A1 | 4/2004 | Jones | |
| 2004/0141787 A1 | 7/2004 | Inokuchi | |
| 2004/0141791 A1 | 7/2004 | Obara | |
| 2005/0057590 A1 | 3/2005 | Nunokawa et al. | |
| 2005/0099486 A1 | 5/2005 | Schmitt et al. | |
| 2005/0151775 A1 | 7/2005 | Edwards et al. | |
| 2005/0185040 A1 | 8/2005 | Nagashima | |
| 2006/0210681 A1 | 9/2006 | Churnick | |
| 2007/0099462 A1 | 5/2007 | Helma et al. | |
| 2007/0187870 A1 | 8/2007 | Lundstrom et al. | |
| 2007/0236535 A1 | 10/2007 | Baker et al. | |
| 2010/0042245 A1 | 2/2010 | Chou et al. | |
| 2011/0090277 A1 | 4/2011 | Pomerantz et al. | |
| 2012/0120134 A1 | 5/2012 | Gunnell et al. | |
| 2013/0002780 A1 | 1/2013 | Miyashita | |
| 2013/0220984 A1 | 8/2013 | Cronin et al. | |
| 2016/0300128 A1 | 10/2016 | Alvig et al. | |
| 2017/0320335 A1 | 11/2017 | Wooldridge et al. | |
| 2017/0341424 A1* | 11/2017 | Sakai | B41J 11/58 |
| 2018/0257416 A1 | 9/2018 | Wooldridge et al. | |
| 2018/0326763 A1 | 11/2018 | Wooldridge et al. | |
| 2019/0061356 A1 | 2/2019 | Squires et al. | |
| 2019/0070856 A1* | 3/2019 | Baterna | B41J 2/16547 |
| 2020/0147630 A1 | 5/2020 | Lipson | |
| 2020/0247147 A1 | 8/2020 | Snyder et al. | |

FOREIGN PATENT DOCUMENTS

| | | |
|---|---|---|
| CN | 103640337 A | 3/2014 |
| CN | 105082781 B | 5/2017 |
| CN | 111516394 A | 8/2020 |
| CN | 114179511 A | 3/2022 |
| EP | 1150245 A2 | 10/2001 |
| EP | 1231067 A2 | 1/2002 |
| EP | 1629979 A1 | 3/2006 |
| EP | 2726297 B1 | 5/2017 |
| EP | 3689623 A1 | 8/2020 |
| EP | 3967505 B1 | 8/2023 |
| JP | 11-254657 A | 9/1999 |
| JP | 2001-322380 A | 11/2001 |

OTHER PUBLICATIONS

Extended European Search Report, European Patent Application No. 20782132.3, dated Nov. 14, 2022 (9 pages).

International Search Report and Written Opinion, International Patent Application No. PCT/IB2020/052957, dated Jul. 6, 2020 (12 pages).

Office Action issued in Chinese Patent application No. 202080028768.3, dated Oct. 10, 2022 (16 pages).

* cited by examiner

DROP-ON-DEMAND CARD PRINTER WITH INK TRAY

FIELD

This disclosure relates to card processing systems that perform drop-on-demand (DOD) printing on plastic cards including, but not limited to, financial (e.g., credit, debit, or the like) cards, driver's licenses, national identification cards, business identification cards, gift cards, and other plastic cards. In some embodiments, the concepts described herein can be applied to substrates other than plastic cards including, but not limited to, passport pages, and non-personalized substrates such as paper.

BACKGROUND

When printing on the surface of a plastic card, it is often desirable that a surface of the card be printed edge-to-edge so that the applied ink extends all the way up to each edge of the card or up to select edges of the card, for example up to the leading edge and/or the trailing edge and/or each one of the side edges. Edge-to-edge printing eliminates a white border that can appear where the applied ink stops short of an edge.

In DOD printing on a plastic card, ink is ejected from one or more print heads onto the card surface. During edge-to-edge printing, as the printing approaches an edge of the card, the ejected ink may "overspray" the edge and fall onto a structure, for example a vacuum belt, of the identification document printer underneath the edge. Over time, the oversprayed ink accumulates on the structure, requiring the structure to be periodically replaced or periodically cleaned. To prevent such overspray, the printing can be stopped a predetermined distance from the edge. However, this does not result in edge-to-edge printing and results in a white border at the edge.

SUMMARY

A DOD plastic card printer (also referred to as an inkjet plastic card printer) is described that includes a tray disposed underneath the plastic card during DOD printing to catch any overspray that may occur during printing on the plastic card. The tray may be disposable so that the tray is intended to be removed and disposed of. In an embodiment, an ink absorbent pad can be disposed in the tray to absorb the oversprayed ink. The ink absorbent pad can be disposed of along with the tray.

The techniques described herein facilitate edge-to-edge printing on a plastic card, or printing near at least one edge of a plastic card where overspray may occur. So the techniques described herein are not limited to printing near all of the edges of the plastic cards. In some embodiments, the print job may require that ink be applied to a surface of the plastic card only near one or more edges but not near one or more other edges. As used herein, the term "edge-to-edge printing" on a plastic card is intended to encompass printing near all of the edges of the plastic card, or near at least one edge of the plastic card.

The tray can be mounted on a card transport that transports the plastic card to and from a drop-on-demand print station that includes at least one drop-on-demand print head. In one embodiment, the tray can be configured so as to be removably mounted on the card transport in a manner that allows an operator of the DOD card printer to manually remove and install the tray using their fingers/hand without requiring the operator to loosen or tighten any mechanical fasteners. In one non-limiting example, the tray can include one or more magnets that magnetically interact with one or more corresponding magnets on the card transport to magnetically removably secure the tray to the card transport.

In another embodiment, a means can be provided that allows the DOD card printer to sense whether the tray is present. If the tray is sensed, edge-to-edge printing on the plastic card can be permitted. If the tray is not sensed, edge-to-edge printing can be prevented. In one non-limiting example, the means for sensing the presence of the tray can include a radio frequency identification (RFID) tag that is fixed to the tray. Alternatively, one or more of the magnets used to removably secure the tray to the card transport could be sensed. Other means for sensing the tray, such as a proximity sensor or a photocell, could also be used. If the RFID tag is used, the RFID tag can store various data thereon, as well as permit data to be read from and/or permit data to be written to the RFID tag. Examples of data that can be stored on the RFID tag include, but are not limited to, the number of plastic cards edge-to-edge printed with the tray in position, an estimated volume of ink absorbed by the ink absorbent pad of the tray, and a date of installation of the tray.

In one embodiment, a plastic card printer includes a drop-on-demand print station that includes at least one drop-on-demand print head and a card transport that is configured to support a plastic card during printing and that is configured to transport the plastic card to a printing position underneath the at least one drop-on-demand print head. A tray is mounted on the card transport so that the tray is positioned under the plastic card and the tray projects beyond at least one edge of the plastic card. With this configuration, the tray is able to collect any ink that oversprays the at least one edge.

In another embodiment, a plastic card printer is provided for edge-to-edge printing on a plastic card having a perimeter edge. The plastic card printer can include a drop-on-demand print station that includes at least one drop-on-demand print head that prints using ink, and a card transport that is configured to support the plastic card during printing and that is configured to transport the plastic card to a printing position underneath the at least one drop-on-demand print head for edge-to-edge printing on the plastic card. A disposable tray is removably mounted on the card transport so that the disposable tray is positioned under the plastic card and the disposable tray projects beyond the perimeter edge of the plastic card to collect ink that oversprays the perimeter edge. The disposable tray can include an ink collection channel, and an ink absorbent pad can be disposed in the ink collection channel to absorb the oversprayed ink.

In some embodiments, the plastic card printers described herein can be part of a plastic card processing system that includes a card input that holds a plurality of cards to be printed, and a card output that holds a plurality of printed cards.

In one embodiment, a method of drop-on-demand printing on a plastic card includes using a card transport to transport the plastic card into a drop-on-demand print station with the plastic card positioned at a printing position underneath at least one drop-on-demand print head, where the card transport includes a tray that is positioned under the plastic card at the printing position with the tray projecting beyond at least one edge of the plastic card. The plastic card is then printed on using the at least one drop-on-demand print head while the tray is positioned under the plastic card.

In another embodiment, a method of edge-to-edge printing in a plastic card printer is provided. The printing occurs on a plastic card having a perimeter edge. The method includes transporting the plastic card to a printing position in a drop-on-demand print station that includes at least one drop-on-demand print head that prints using ink, where the plastic card is transported by a card transport. The plastic card printer senses whether a disposable tray is mounted on the card transport. The tray is configured to be positioned under the plastic card and the tray projects beyond the perimeter edge of the plastic card to collect ink that may overspray the perimeter edge during drop-on-demand edge-to-edge printing on the plastic card. If the disposable tray is sensed, drop-on-demand edge-to-edge printing on the plastic card is performed. If the disposable tray is not sensed, drop-on-demand edge-to-edge printing on the plastic card is prevented.

In some embodiments, the concepts described herein can be applied to edge-to-edge printing on substrates other than plastic cards including, but not limited to, passport pages, and non-personalized substrates such as paper, labels, or the like.

DETAILED DESCRIPTION

Figure 1:
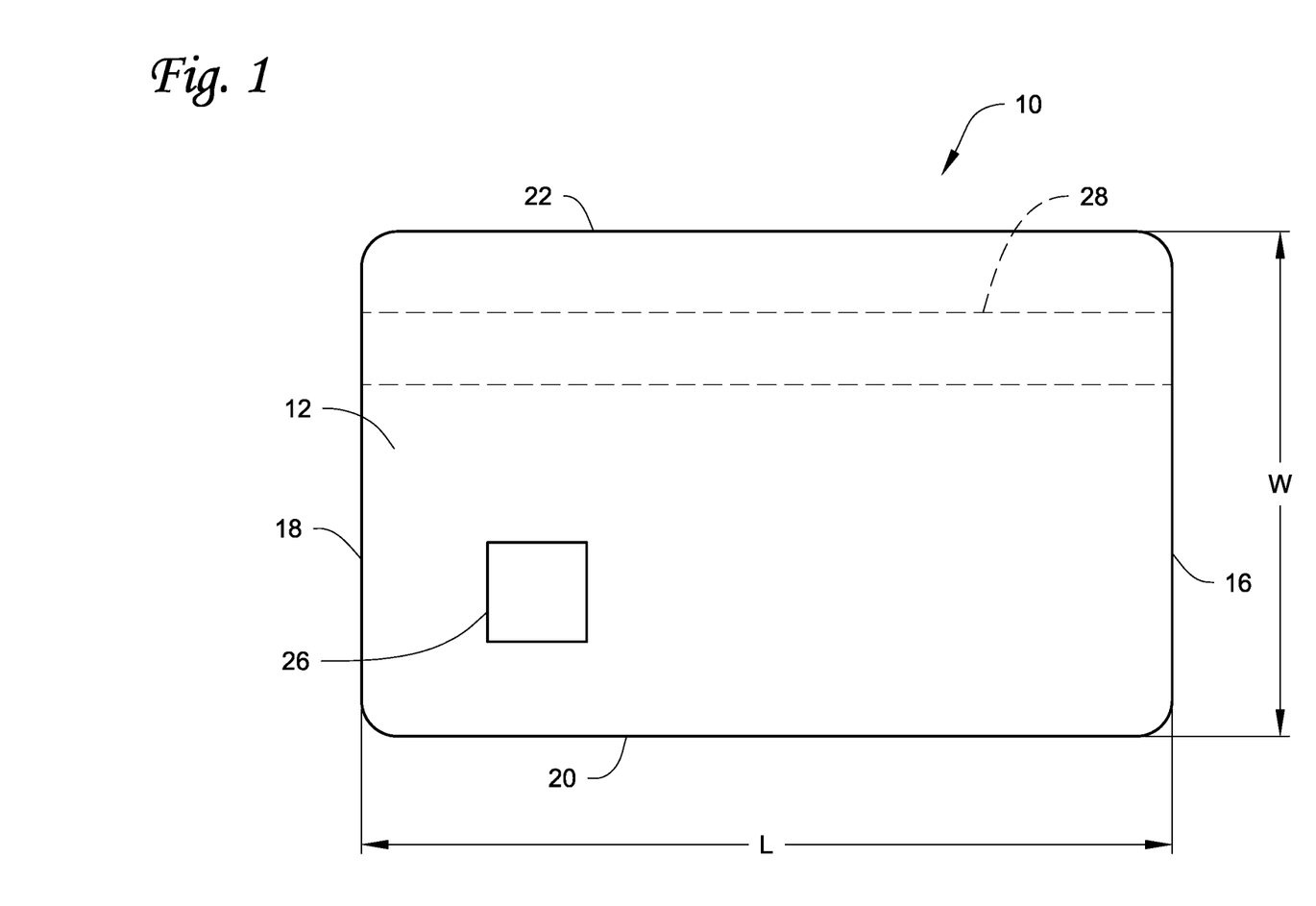
FIG. 1 is a top view of a top/bottom surface of one example of a plastic card that can be printed as described herein.

Referring to FIG. 1, an example of a plastic card 10 which can be DOD printed using a DOD plastic card printer described herein is illustrated. The plastic card 10 can include, but is not limited to, a financial (e.g., credit, debit, or the like) card, a driver's license, a national identification card, a business identification card, a gift card, and other plastic cards. The plastic card 10 is formed partially or entirely of a plastic material as is well known in the art of plastic card printing. In some embodiments, the concepts described herein can be applied to edge-to-edge printing on substrates other than plastic cards including, but not limited to, passport pages, and non-personalized substrates such as paper, labels, or the like.

The plastic card 10 includes a first surface 12 and a second surface 14 (visible in FIG. 7) opposite the first surface 12. The first surface 12 may be considered the top surface of the plastic card 10 or the bottom surface of the plastic card 10. Likewise, the second surface 14 may be considered the bottom surface of the plastic card 10 or the top surface of the plastic card 10. To simplify the description, the first surface 12 will be considered the top surface, while the second surface 14 will be considered the bottom surface.

In the top view of FIG. 1, the plastic card 10 has a perimeter edge that includes a first end edge 16, a second end edge 18, a first longitudinal side edge 20, and a second longitudinal side edge 22. A length L is defined between the first end edge 16 and the second end edge 18, and a width W is defined between the first longitudinal side edge 20 and the second longitudinal side edge 22. In one embodiment, the plastic card 10 can have a length L of about 85.60 mm and a width W of about 53.98 mm. However, other card lengths L and widths W are possible.

The first surface 12 can be printed with background graphics (not shown) as well as a logo and the name of the card issuer (not shown). In some embodiments, the first surface 12 may also be printed with various data (not shown) relating to the intended cardholder such as, but not limited to, an image of the intended cardholder, the name of the intended cardholder, an account number, a card expiration date, and other printed data known in the art of plastic cards. At least some of the printing on the first surface 12 is created by DOD inkjet printing using an ink that is suitable for application to plastic cards. In one non-limiting embodiment, the ink applied by the DOD inkjet printing is radiation curable ink, such as ultraviolet (UV) radiation curable ink. In addition to DOD inkjet printing, other printing techniques can be used to apply printing to the first surface 12, such as retransfer printing, laser marking, thermal transfer, and other printing known in the art.

The second surface 14 can also be printed with background graphics (not shown); various data (not shown) relating to the intended cardholder such as, but not limited to, the name of the intended cardholder, an account number, a card verification value number, a card expiration date, and other printed data known in the art of plastic cards; card issuer contact information; and other data. At least some of the printing on the second surface 14 may be created by DOD inkjet printing using the same type of ink or a different type of ink that is applied to the first surface 12. In addition to DOD inkjet printing, other printing techniques can be used to apply printing to the second surface 14, such as retransfer printing, laser marking, thermal transfer, and other printing known in the art.

Some of the printing that takes place on the first surface 12 or on the second surface 14 may occur by DOD inkjet printing using an ink such as UV curable ink. To facilitate the description, it will be assumed that the first surface 12 is the printed surface to which the ink is to be applied. However, the second surface 14 could be the printed surface, or after the first surface 12 is printed, the second surface 14 could later be subject to DOD inkjet printing and become the printed surface.

The card 10 may also be provided with various other features. For example, as shown in FIG. 1, the card 10 may be provided with an integrated circuit chip 26 that is accessible via the first surface 12 (or alternatively via the second surface 14), or the chip 26 may be completely embedded in the card 10. The card 10 can also include a magnetic stripe 28 (shown in dashed lines) on the second surface 14. The integrated circuit chip 26, which can be a contact chip or a contactless chip, can be electronically programmed with data and/or data can be electronically read therefrom using an integrated circuit chip programming device known in the art. The magnetic stripe 28 (if present) can have data magnetically written to and/or data read therefrom using a suitable magnetic stripe read/write device known in the art.

Assuming the first surface 12 is the printed surface, some of the DOD inkjet printing may take place near one or more of the edges 16, 18, 20, 22, or in the case of true edge-to-edge printing, the inkjet printing may take place near all of the edges 16, 18, 20, 22. However, when inkjet printing near one of the edges 16, 18, 20, 22, some of the ink delivered from the DOD print head may overspray the edge. The term "overspray" and the like as used herein refers to ink that is ejected from the DOD print head that does not fall onto the card surface. As discussed in further detail below, a tray 30 is positioned under some or all of the edges of the card 10 to catch any oversprayed ink and prevent the oversprayed ink from contaminating undesired structures of the DOD card printer, such as the card transport used to transport the card 10.

Figure 2:
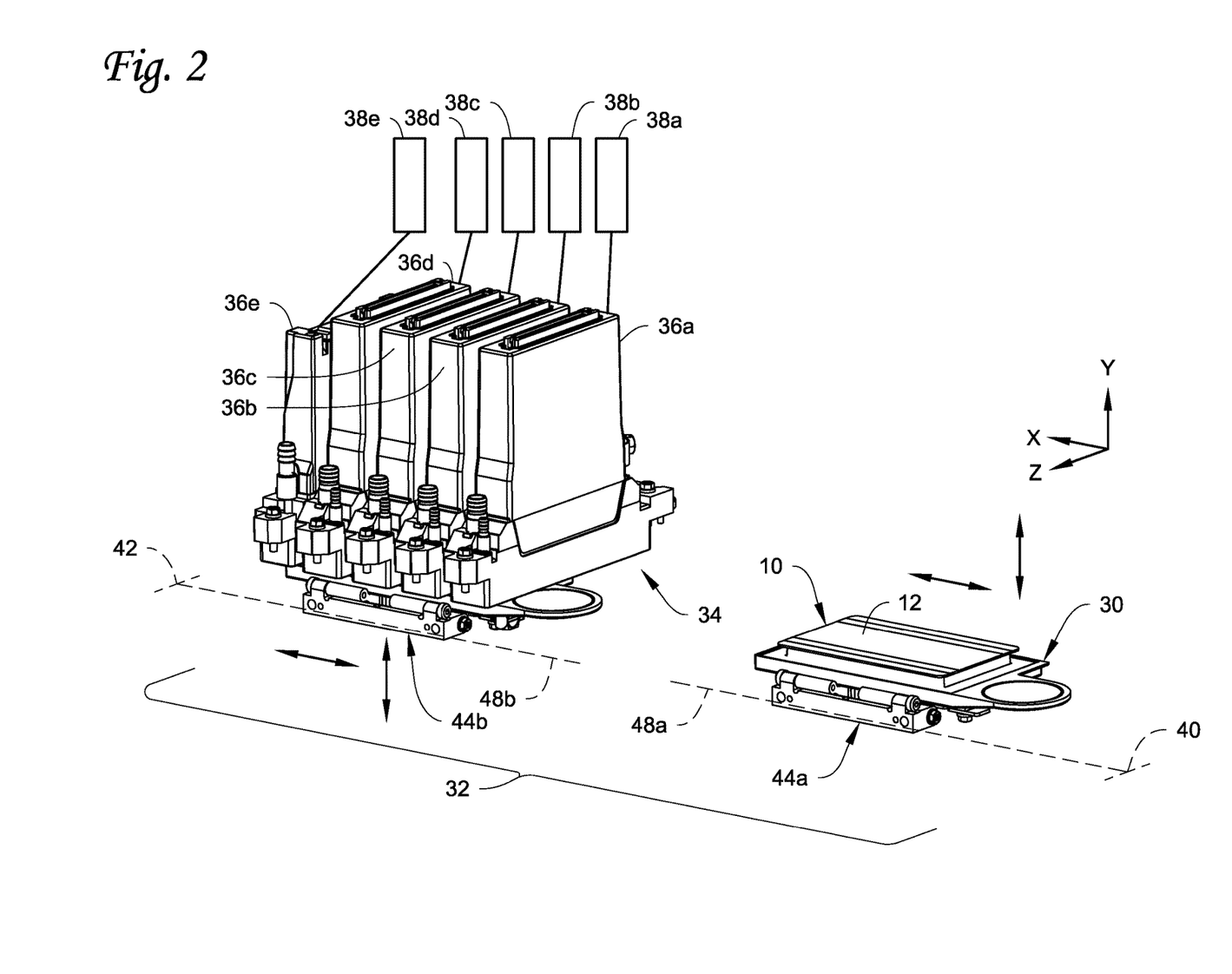
FIG. 2 is a perspective view of a portion of a plastic card printer described herein.

FIG. 2 illustrates a portion of a DOD plastic card printer 32 described herein. The plastic card printer 32 is configured to perform DOD inkjet printing at a drop-on-demand print station 34 that includes at least one drop-on-demand print head. The printing performed by the card printer 32 can be monochromatic or multi-color. FIG. 2 illustrates the print station 34 as including five drop-on-demand print heads 36a-e each of which prints a different color ink or other material to be applied to the card surface 12, 14. The print heads 36a-e are arranged side-by-side to sequentially print onto the surface 12, 14 of the card 10 as the card 10 is transported past the print heads 36a-e, for example underneath the print heads 36a-e. However, a smaller or larger number of print heads, including one of the print heads, can be utilized. Each print head 36a-e is supplied with its respective ink from a corresponding ink or material supply 38a-e.

The print heads 36a-e can print using any suitable ink or coating used in drop-on-demand printing and that is suitable for use on the types of cards described herein. For example, the ink can be a UV curable ink, a heat curable ink that can be cured by applying heat to the heat curable ink, or other ink or materials that can be deposited by print heads 36a-e. In the case of the five print heads 36a-e in FIG. 2, each print head can print a specific color ink. For example, the print head 36a can print cyan colored ink, the print head 36b can print magenta colored ink, the print head 36c can print yellow colored ink, the print head 36d can print black ink, and the print head 36e can print white ink. An example of a drop-on-demand printer that prints using UV curable ink in a card printing system is the Persomaster card personalization system available from Atlantic Zeiser GmbH of Emmingen, Germany. If printing on both surfaces 12, 14 of the card 10 is required, a card flipper or card reorienting mechanism (not shown) can be included to flip or rotate the card 10 180 degrees so that the surface 14 now faces upward and the surface 12 faces downward, and the card 10 is then transported back upstream of the print heads 36a-e to print on the surface 14. Examples of card flippers are disclosed in U.S. Published Application No. 2013/0220984 and U.S. Pat. No. 7,398,972 the entire contents of each are incorporated herein by reference. In other embodiments, a card flipper followed by a second DOD plastic card printer, which can be identical to the card printer 32, could be provided in order to print on both sides of the card. This would eliminate the need to transport the card 10 back upstream of the print heads 36a-e of the single card printer.

The specific construction and operation of the print heads 36a-e is well known and can be identical to the construction and operation of DOD print heads known in the art. The print heads 36a-e each includes a bottom surface that faces downward toward the card to be printed on, and a nozzle plate, through which ink is ejected, is provided on the bottom surface.

With continued reference to FIG. 2, the card printer 32 further includes an input end 40 through which the card 10 can enter the card printer 32 for printing on the card 10, and a card output end 42 through which the card 10 can exit the card printer 32 after printing (or exit if no printing takes place). The input end 40 and the output end 42 can take any form suitable for allowing cards to enter and exit the card printer 32, for example input and output slots. The card printer 32 further includes a card transport mechanism that transports cards 10 from the input end 40, through the print station 34, and then to the output end 42. In some embodiments, the card transport mechanism may also transport cards 10 back toward the input end 40. In the illustrated embodiment, the card transport mechanism has at least first and second separate card transports 44a, 44b (or first and second card transport means 44a, 44b) each of which can receive a card 10 from the input end 40, support the card 10 as the card 10 is transported in the card printer 32 and during printing in the print station 34, and ultimately deliver the card 10 to the output end 42. Although the card transport mechanism is illustrated as having the two card transports 44a, 44b, additional card transports or only a single one of the card transports 44a, 44b can be provided as well.

Figure 5:
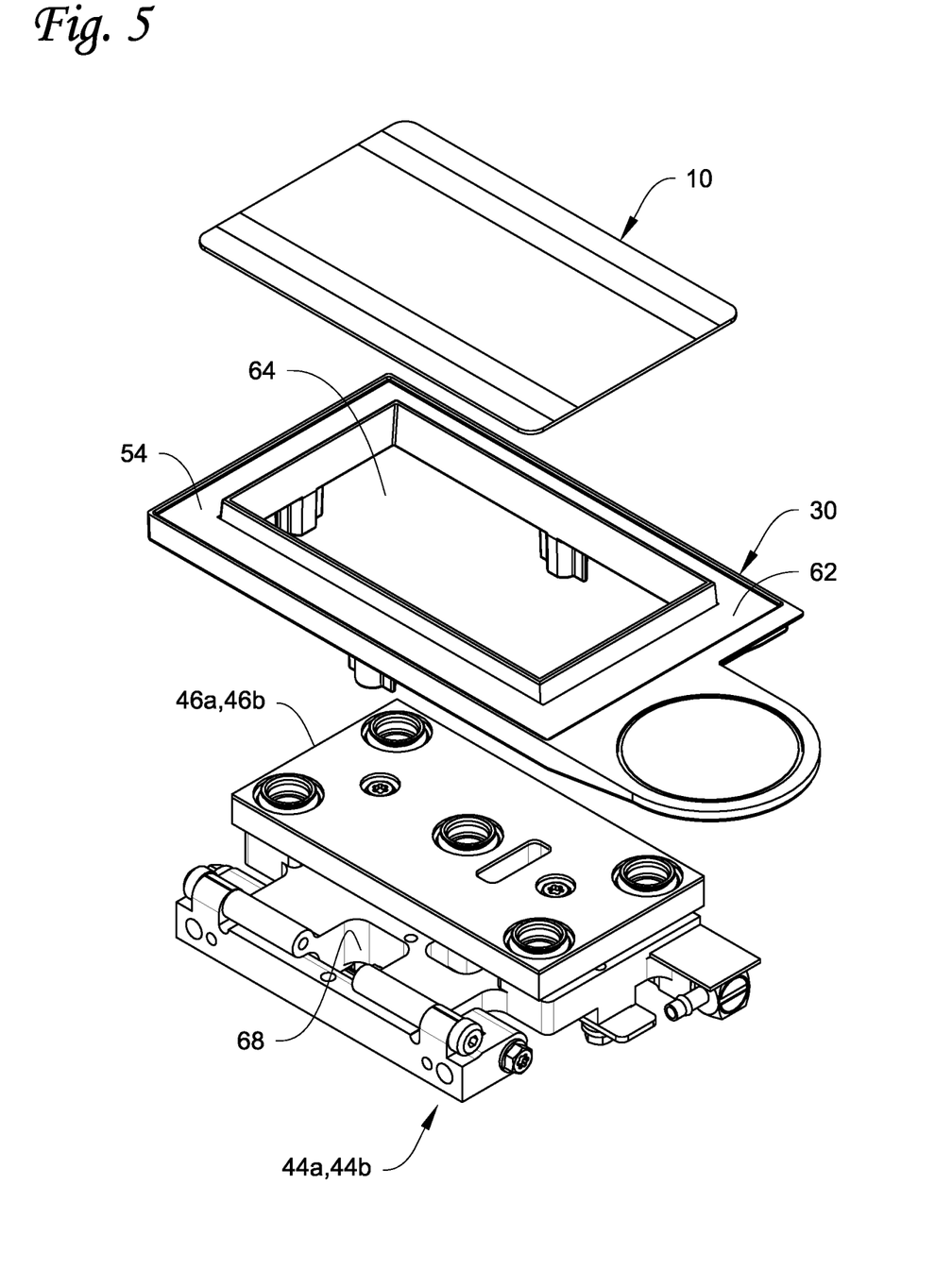
FIG. 5 is an exploded, perspective view of the card transport and the tray to be supported on the card transport.

Each card transport 44a, 44b can include a vacuum platen 46a, 46b (best seen in FIG. 5). Each vacuum platen 46a, 46b is configured to apply a vacuum to a card 10 disposed thereon, much like a conventional vacuum belt, to retain the card 10 in position on the platen 46a, 46b during transport and during printing in the card printer 32. A pair of rails 48a, 48b (illustrated schematically in dashed lines in FIG. 2) are provided, and the vacuum platen 46a is movably supported on the rail 48a while the vacuum platen 46b is movably supported on the rail 48b. Each card transport 44a, 44b forms a two axis or an X-Y axis transport system where each of the vacuum platens 52 is actuatable along the X and Y axes as indicated by the double-headed arrows in FIG. 2.

A common card pick-up position is defined near or adjacent to the input end 40, while a common card discharge position is defined near or adjacent to the output end 42. The common card pick-up position and the common card discharge position are locations in the card printer 32 that permit each of the vacuum platens 46a, 46b to be separately positioned at separate times at the same location in the card printer 32 to pick-up cards that are input via the input end 40 and to deliver the cards to the output end 42 for discharge of the cards. So the word "common" in the common card pick-up position and the common card discharge position refers to the situation where the vacuum platens 46a, 46b can each occupy the same space in the card printer 32, but at different times, and the card transports 44a, 44b are suitably designed to actuate the vacuum platens 46a, 46b between the common card pick-up position and the common card discharge position without the vacuum platens 46a, 46b interfering with one another. Further information on the construction and operation of the card transports 44a, 44b are disclosed in U.S. published application no. 2018/0326763 titled Dual Card Transport in a Card Processing System, the entire contents of which are incorporated herein by reference.

FIG. 2 illustrates the card transport 44b and the vacuum platen 46b thereof positioned underneath the print heads 36a-e with a card (not shown) held by the vacuum platen for printing on the card. After printing is complete, the card transport 44b will be actuated to the output end 42 to output the printed card. The card transport 44b will then be actuated to return to the input end 40 to pick up a new card to be printed. As this is occurring, the card transport 44a and the vacuum platen thereof, with a card 10 supported thereon to be printed, will be actuated to a position underneath the print heads 36a-e for printing on the card 10.

Figure 3:
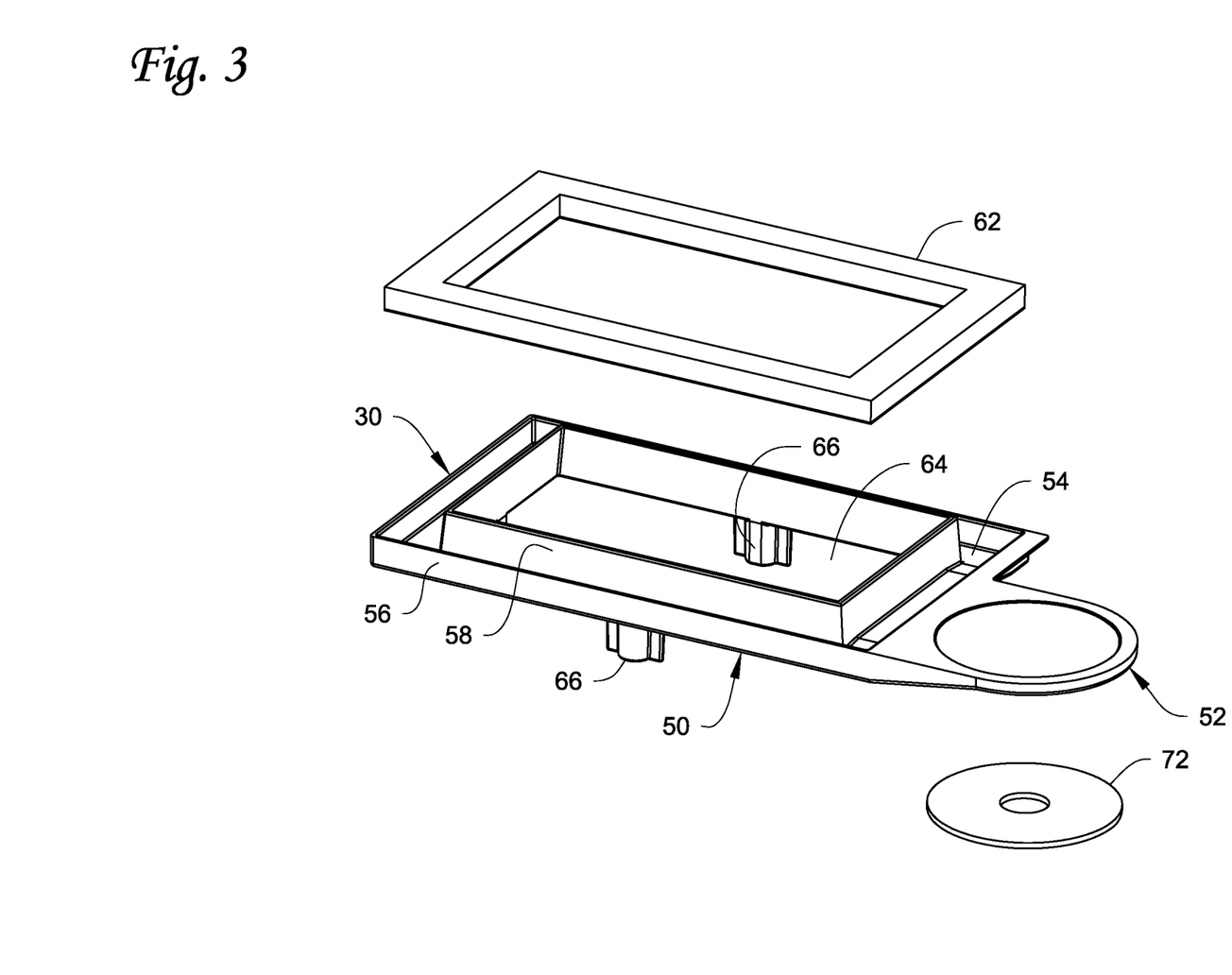
FIG. 3 is an exploded, perspective view of the tray and ink absorbent pad.
Figure 4:
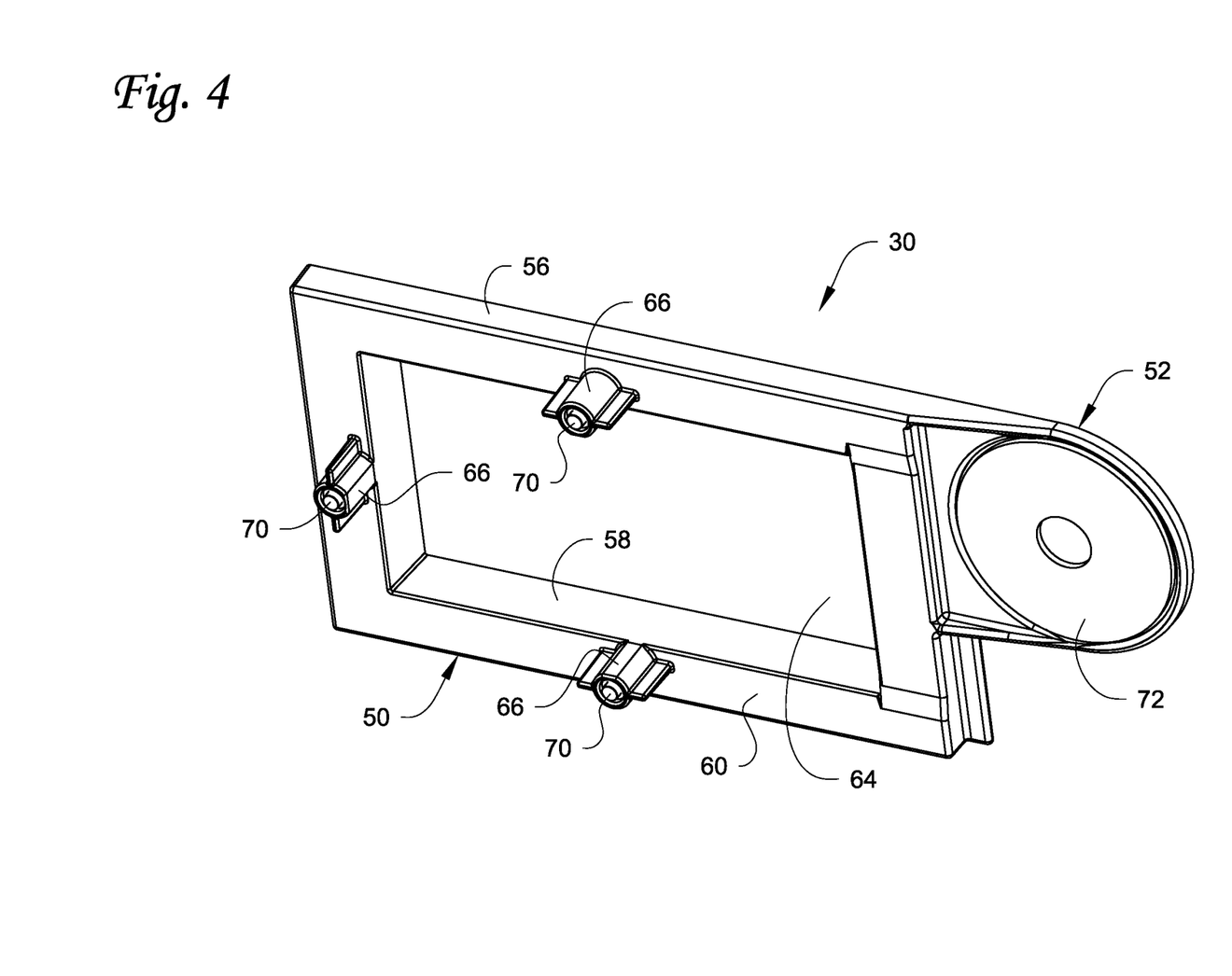
FIG. 4 is a bottom perspective view of the tray.

With reference to FIG. 3-5, the tray 30 is designed to be removably mounted on the card transport 44a, 44b so as to move with the card transport 44a, 44b. The tray 30 can be made of plastic or other lightweight material to minimize the weight of the tray 30. In some embodiments, the tray 30 can also be disposable whereby the tray 30 is intended to be discarded at the end of its intended life. The term "removably mounted" or similar as used herein and in the claims means that the tray 30 is secured to the card transport 44a, 44b in a manner that allows an operator of the DOD card printer to manually remove and install the tray 30 using their fingers/hand without requiring the operator to loosen or tighten any mechanical fasteners.

In the embodiment illustrated in FIGS. 3-5, the tray 30 has a main body 50 with a tab 52 projecting from one end of the main body 50. The tab 52 is intended to provide a means for a user to grip and hold the tray 30 during removal and installation of the tray 30. The tray 30 includes an ink collection channel 54 that is intended to collect oversprayed ink. The channel 54 is defined by an outer wall 56, an interior wall 58 spaced from the outer wall 56, and a bottom wall 60 that interconnects the outer wall 56 and the interior wall 58. In some embodiments, an ink absorbent pad 62 can be disposed in the channel 54, with the pad 62 intended to absorb oversprayed ink rather than the ink sitting loosely in the channel 54. The pad 62 may be disposed of along with the tray 30. Instead of the tray 30 being disposable, in some embodiments the pad 62 can be disposable and replaced with a new pad 62 that is inserted into the same tray 30, whereby the tray 30 is re-used at least once instead of being disposable along with the pad 62.

Figure 7:
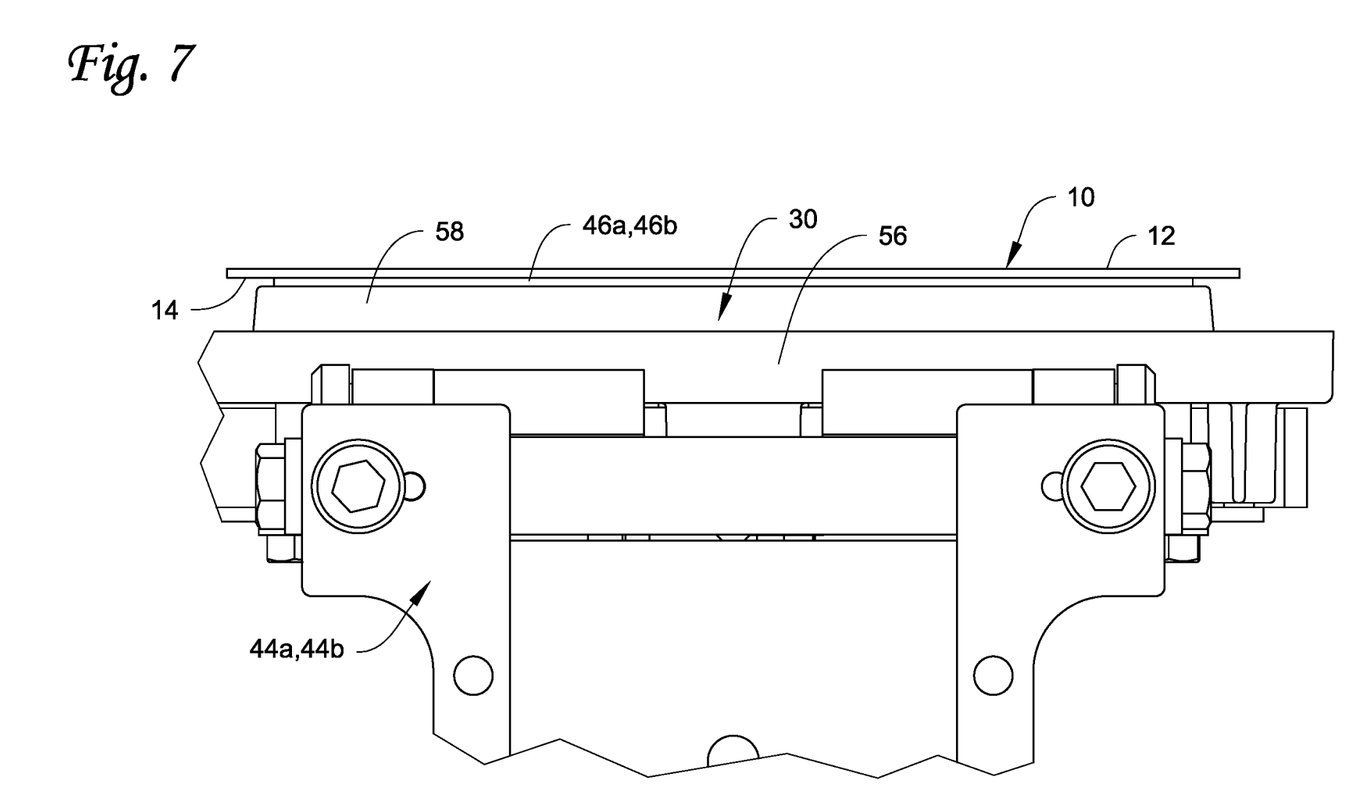
FIG. 7 is a side view of the card transport, the tray and the card on the card transport.

The tray 30 includes a central opening 64 defined by the interior wall 58. The central opening 64 allows passage of the vacuum platen 46a, 46b through the tray 30 in order to engage with the card 10. As shown in FIG. 7, when the tray 30 is properly mounted on the card transport 44a, 44b, an upper end of the vacuum platen 46a, 46b projects above the top edge of the interior wall 58 of the tray 30 so that the card 10 is supported on the vacuum platen 46a, 46b at a distance above the upper edge of the interior wall 58 whereby the card 10 is not in direct physical contact with the tray 30.

The tray 30 can have any configuration that allows the tray 30 to be removably mounted on the card transport 44a, 44b, that allows the vacuum platen 46a, 46b to engage with the card 10, and that allows the tray 30 to catch oversprayed ink. In the embodiment illustrated in FIGS. 3-5, the main body 50 is generally rectangular, the ink collection channel 54 is generally rectangular, and the central opening 64 is generally rectangular. However, other shapes such as square, circular, triangular, and the like could be used.

The tray 30 further includes means for removably securing the tray 30 to the card transport 44a, 44b in a manner that permits a user to remove and install the tray 30 by gripping the tab 52. In the illustrated example in FIGS. 3-5, the means for removably securing comprises a plurality of bosses 66 on the main body 50 that are positioned and configured to engage with corresponding receptacles 68 on the card transport 44a, 44b (only one receptacle 68 is visible in FIG. 5). The bosses 66 can be located anywhere on the main body 50 to achieve the removable securing function. For example, the bosses 66 can project downwardly from the bottom wall 60.

If additional securement of the tray 30 to the card transport 44a, 44b is desired, each boss 66 can be provided with a magnet 70 at the base thereof that magnetically interface with corresponding magnets (not shown) in the receptacles 68 to magnetically secure the tray 30 to the card transport 44a, 44b.

With continued reference to FIGS. 3-4, a radio frequency identification (RFID) tag 72 can be fixed to the tray 30, for example to the bottom side of the tab 52. The RFID tag 72 permits storage of various data thereon, as well as functions as a means for sensing the presence of the tray 30 by a suitable RFID tag reader/writer (not shown) to determine whether the tray 30 is installed on the card transport 44a, 44b prior to beginning a printing operation where overspray of the ink may occur. One or more of the magnets 70 (if used) may also be sensed by a suitable detection device to detect the presence of the tray 30 prior to beginning a printing operation where overspray of the ink may occur. Other means for sensing the tray, such as a proximity sensor or a photocell, could also be used.

The RFID tag 72 can store data thereon, as well as permit data to be read from and/or permit data to be written to the RFID tag 72. Examples of data that can be stored on the RFID tag 72 include, but are not limited to, the number of plastic cards edge-to-edge printed with the tray 30 in position, an estimated volume of ink absorbed by the ink absorbent pad 62 of the tray 30, and a date of installation of the tray 30 onto the card transport 44a, 44b. The volume of ink absorbed by the pad 62 can be estimated by estimating an amount of oversprayed ink that will occur with each edge-to-edge print job on each plastic card 10. In some embodiments, if the RFID tag 72 is not detected by the RFID tag reader/writer, the system can prevent edge-to-edge printing by the card printer 32 although the system can permit non-edge-to-edge printing where overspray of the ink will not occur.

Figure 6:
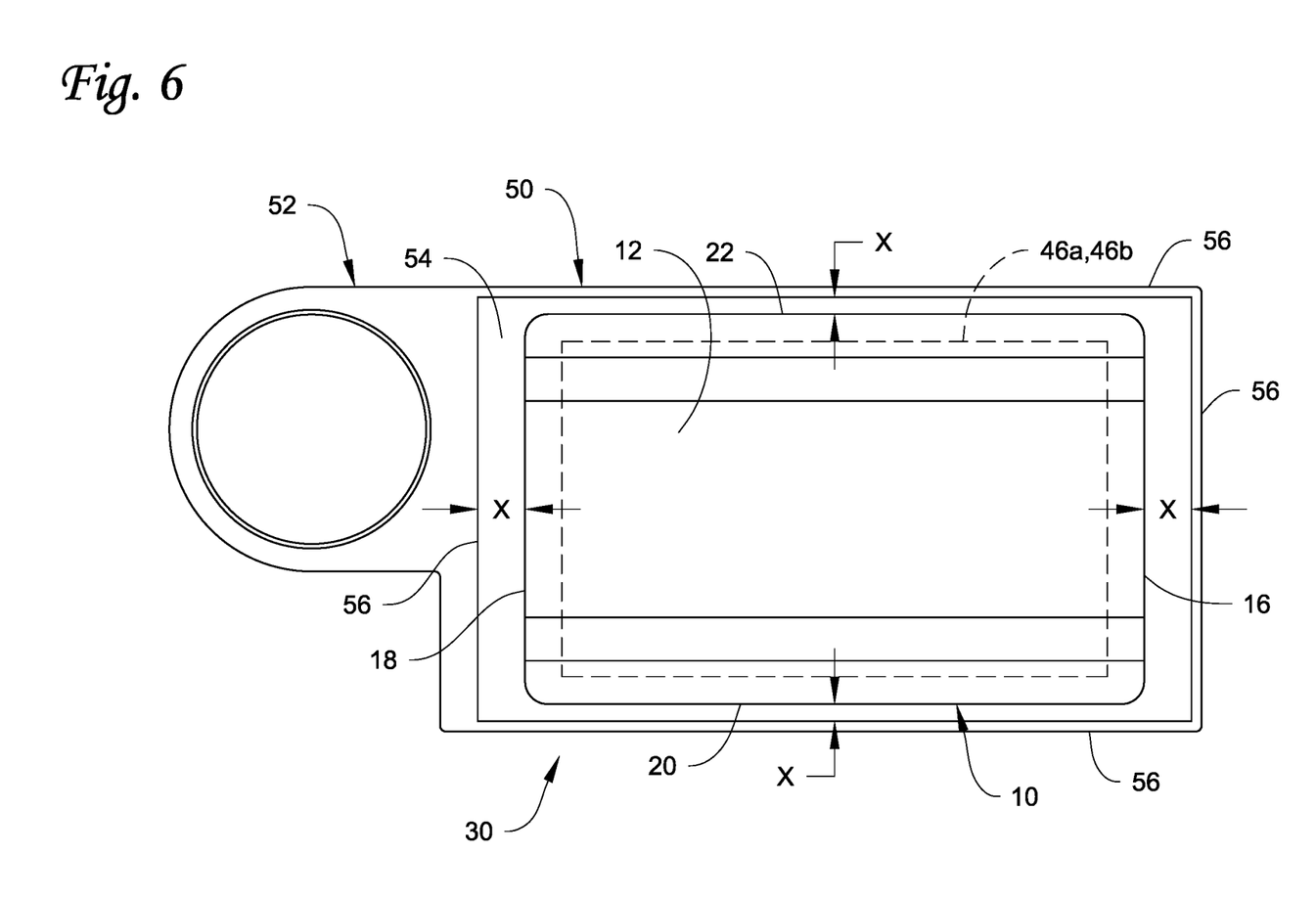
FIG. 6 is a top view of the tray along with the card.

FIG. 6 illustrates the relative positioning of the card 10 and the tray 30 when the card 10 is in position on the card transport. The vacuum platen 46a, 46b is shown in dashed lines. The card 10 is positioned so that the edges 16, 18, 20, 22 are disposed over and above the channel 54 of the tray 30. Another way of describing the positioning between the card 10 and the tray 30 is that the tray 30 is positioned under the card 10 and the tray 30 projects beyond at least one edge of the card, preferably all of the edges 16, 18, 20, 22 so that the edges 16, 18, 20, 22 are aligned with the channel 54. Accordingly, in the top view of FIG. 6, there is a gap X between each edge 16, 18, 20, 22 and the outer wall 56. The gap X can be the same for each one of the edges 16, 18, 20, 22, or the gap X could be different for one or more of the edges 16, 18, 20, 22.

As a result of the positioning between the card 10 and the tray 30, ink that oversprays any one of the edges 16, 18, 20, 22 of the card 10 will fall into the channel 54 and be absorbed by the pad 62. After a number of cards have been printed, the tray 30 can be lifted from the card transport by the user gripping the tab 52. The tray 30 can then be disposed of, or cleaned for reuse. If the tray is disposed of, a new tray 30 can then be installed on the card transport to continue printing new cards.

Figure 8:
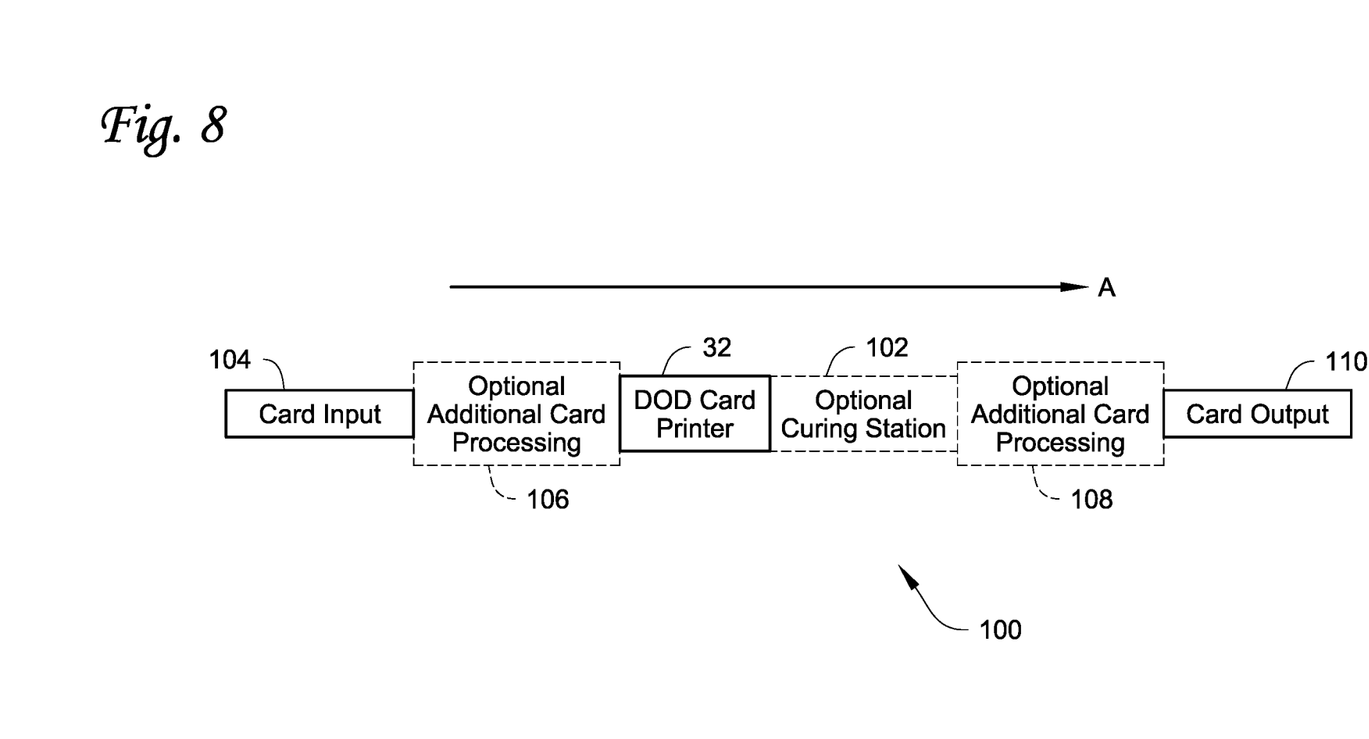
FIG. 8 schematically depicts one embodiment of a plastic card processing system in which the plastic card printer described herein can be implemented

The card printer 32 can be used as a stand-alone printer, or used with other systems in a plastic card processing system. FIG. 8 schematically depicts one embodiment of a plastic card processing system 100 in which the card printer 32 described herein can be implemented. The system 100 is configured as a central issuance system with multiple processing stations or modules. An example of a central issuance system is the MX or MPR-lines of central issuance systems available from Entrust Datacard Corporation of Shakopee, Minnesota. Additional examples of central issuance systems are disclosed in U.S. Pat. Nos. 4,825,054, 5,266,781, 6,783,067, and 6,902,107, all of which are incorporated herein by reference in their entirety.

In another embodiment, the card printer 32 can be used in a desktop card processing system. An example of a desktop plastic card processing system is the CD800 Card Printer available from Entrust Datacard Corporation of Shakopee, Minnesota. Additional examples of desktop card processing systems are disclosed in U.S. Pat. Nos. 7,434,728 and 7,398,972, each of which is incorporated herein by reference in its entirety.

The system 100 illustrated in FIG. 8 includes the DOD plastic card printer 32 and an optional curing station 102, such as a UV curing station if UV curable ink is printed by the printer 32. The system 100 can also include a card input 104, one or more optional additional card processing stations 106 between the card input 104 and the card printer 32, one or more optional additional card processing stations 108 between card printer 32 and a card output 110. Each plastic card 10 progresses through the system 100 generally in the direction of the arrow A.

The curing station 102 (if present) is configured to cure radiation curable ink applied to the card surface. An example of a curing station that applies UV radiation in a card printing system is the Persomaster card personalization system available from Atlantic Zeiser GmbH of Emmingen, Germany.

The card input 104 is configured to hold a plurality of plastic cards waiting to be processed. Cards are fed one-by-one from the card input 104 into the rest of the system 100 where each card is individually printed and otherwise processed. Processed plastic cards are ultimately transported into the card output 110 that is configured to hold a plurality of the printed plastic cards.

The optional additional card processing station(s) 106 can be between the card input 104 and the card printer 32. The optional additional card processing station(s) 108 can be between the card printer 32 and the card output 110. The optional additional card processing station(s) 106, 108 can be plastic card processing stations known in the art to perform plastic card processing operations that are known in the art. For example, the optional additional card processing stations can include a magnetic stripe read/write system that is configured to read data from and/or write data to the magnetic stripe 28, and/or an integrated circuit chip programming system that is configured to program the integrated circuit chip 26. Magnetic stripe read/write systems and integrated circuit chip programming systems are disclosed, for example, in U.S. Pat. Nos. 6,902,107 and 6,695,205 the entire contents of which are incorporated herein by reference, and can be found in the MX family of central issuance systems available from Entrust Datacard Corporation of Shakopee, Minnesota. The optional additional card processing station(s) 106, 108 can also be configured to perform one or more of embossing; indenting; laminating; laser marking; apply a topcoat; a quality control station that is configured to check the quality of personalization/processing applied to the cards; a security station that is configured to apply a security feature such as a holographic foil patch to the cards; and other card processing operations.

Other than the card transport mechanism used in the card printer 32, transport of the plastic cards 10 in other portions of the system 100 can occur using conventional card transport mechanisms that are known in the art. Examples of card transport mechanisms that could be used are known in the art and include, but are not limited to, transport rollers, transport belts (with tabs and/or without tabs), vacuum transport mechanisms, transport carriages, and the like and combinations thereof. Card transport mechanisms are well known in the art including those disclosed in U.S. Pat. Nos. 6,902,107, 5,837,991, 6,131,817, and 4,995,501 and U.S. Published Application No. 2007/0187870, each of which is incorporated herein by reference in its entirety. A person of ordinary skill in the art would readily understand the type(s) of card transport mechanisms that could be used, as well as the construction and operation of such card transport mechanisms.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A card printer that prints on a card, comprising:
   a drop-on-demand print station that includes at least one drop-on-demand print head, the drop-on-demand print station is configured to receive and print on the card;
   a card transport that is configured to transport the card to the drop-on-demand print station and to a printing position; and
   a tray mounted on the card transport and configured so that the tray is positioned under the card during printing on the card by the at least one drop-on-demand print head, the tray projects beyond edges of the card; and
   the card is mounted on the card transport at a distance above the tray whereby the card is not in direct physical contact with the tray.

2. The card printer of claim 1, wherein the tray includes an ink collection channel, and the edges of the card overlap and are disposed above the ink collection channel, the tray projects beyond each edge of the card, and the ink collection channel is configured so that each edge of the card overlaps and is disposed above the ink collection channel.

3. The card printer of claim 2, further comprising an ink absorbent pad disposed in the ink collection channel.

4. The card printer of claim 1, wherein the tray is removably mounted on the card transport.

5. The card printer of claim 2, wherein the ink collection channel is defined by an outer wall, an interior wall, and a bottom wall; and the outer wall, the interior wall and the bottom wall are disposed beneath the card.

6. The card printer of claim 5, wherein the tray includes an opening defined by the interior wall, and the card transport extends through the opening.

7. The card printer of claim 6, wherein the ink collection channel surrounds the opening.

8. The card printer of claim 1, wherein the card transport includes a vacuum platen, and the vacuum platen extends through the tray.

9. A card processing system, comprising:
   a card input that holds a plurality of cards to be printed, each card having an integrated circuit chip and/or a magnetic stripe;
   a card output that holds a plurality of the cards that have been printed;
   a drop-on-demand print station that includes at least one drop-on-demand print head, the drop-on-demand print station is configured to receive and print on one of the cards input from the card input;

a card transport that is configured to transport the one card to the drop-on-demand print station and to a printing position;

an integrated circuit chip programming system that is configured to program the integrated circuit chip of the one card and/or a magnetic stripe read/write system that is configured to read data from and/or write data to the magnetic stripe of the one card; and a tray mounted on the card transport and configured so that the tray is positioned under the one card during printing on the one card by the at least one drop-on-demand print head, the tray projects beyond at least one edge of the one card; and the one card is mounted on the card transport at a distance above the tray whereby the one card is not in direct physical contact with the tray.

10. The card processing system of claim 9, wherein the tray includes an ink collection channel, and the edges of the one card overlap and are disposed above the ink collection channel, the tray projects beyond each edge of the one card, and the ink collection channel is configured so that each edge of the one card overlaps and is disposed above the ink collection channel.

11. The card processing system of claim 10, further comprising an ink absorbent pad disposed in the ink collection channel.

12. The card processing system of claim 9, wherein the tray is removably mounted on the card transport.

13. The card processing system of claim 10, wherein the ink collection channel is defined by an outer wall, an interior wall, and a bottom wall; and the outer wall, the interior wall and the bottom wall are disposed beneath the one card.

14. The card processing system of claim 13, wherein the tray includes an opening defined by the interior wall, and the card transport extends through the opening.

15. The card processing system of claim 14, wherein the ink collection channel surrounds the opening.

16. The card processing of claim 9, wherein the card transport includes a vacuum platen, and the vacuum platen extends through the tray.

17. The card printer of claim 1, wherein the card transport includes a front edge, a rear edge, a first side edge, and a second side edge; and the card projects beyond the front edge, the rear edge, the first side edge, and the second side edge.

18. The card printer of claim 1, further comprising a sensor that senses the presence of the tray.

19. The card processing system of claim 9, wherein the card transport includes a front edge, a rear edge, a first side edge, and a second side edge; and the one card projects beyond the front edge, the rear edge, the first side edge, and the second side edge.

20. The card processing system of claim 9, further comprising a sensor that senses the presence of the tray.

21. The card processing system of claim 9, further comprising a card flipper that flips the one card 180 degrees.

22. The card processing system of claim 9, further comprising a curing station that cures radiation curable ink applied to the one card by the at least one drop-on-demand print head.

* * * * *